US012777106B2

(12) United States Patent
Abd-Alhaleem et al.

(10) Patent No.: US 12,777,106 B2
(45) **Date of Patent: *Oct. 27, 2026**

(54) SYMMETRIC COMMUNICATION FOR ASYMMETRIC ENVIRONMENTS

(71) Applicant: Amazon Technologies, Inc., Seattle, WA (US)

(72) Inventors: Saleh Abd-Alhaleem, Kefar Manda (IL); Leah Shalev, Zichron Yaakov (IL); Hani Ayoub, Majd Al Kurum (IL); Avigdor Segal, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/427,670

(22) Filed: Jan. 30, 2024

(65) Prior Publication Data

US 2024/0171662 A1 May 23, 2024

Related U.S. Application Data

(63) Continuation of application No. 17/348,339, filed on Jun. 15, 2021, now Pat. No. 11,917,041.

(51) Int. Cl.
*H04L 69/22* (2022.01)
*H04L 67/14* (2022.01)

(52) U.S. Cl.
CPC .............. *H04L 69/22* (2013.01); *H04L 67/14* (2013.01)

(58) Field of Classification Search
CPC ................................ H04L 69/22; H04L 67/14
See application file for complete search history.

(56) References Cited

U.S. PATENT DOCUMENTS 7,921,188 B2 * 4/2011 Oehler .................. G06F 9/5061 709/212
8,873,567 B1 10/2014 Mandal et al.
2003/0051163 A1 3/2003 Bidaud
2003/0225938 A1 * 12/2003 Glasco ................ G06F 12/0284 711/E12.013
2004/0088522 A1 5/2004 Watson et al.
2008/0294794 A1 11/2008 Darugar et al.
2010/0322076 A1 12/2010 Goel
2011/0188503 A1 8/2011 Hewson
2012/0210172 A1 8/2012 Gara et al.
2014/0013079 A1 * 1/2014 Watson, Jr. ....... G06F 15/17337 712/28
2014/0229621 A1 8/2014 Song et al.
2016/0234115 A1 * 8/2016 Tran .................... H04L 49/1576
2018/0011905 A1 1/2018 Liu et al.
2019/0104050 A1 * 4/2019 Cidon ..................... H04L 12/14
2021/0034433 A1 2/2021 Mayrack et al.

* cited by examiner

*Primary Examiner* — Scott B Christensen
*Assistant Examiner* — Zonghua Du
(74) *Attorney, Agent, or Firm* — Klarquist Sparkman, LLP

(57) ABSTRACT

Communication in an asymmetric multiengine system is handled using engine routing tables defining subsets of engines to control engine-to-engine connection mapping. Local devices perform an engine selection process that includes selecting an engine routing table based on a number of remote engines in a remote device and selecting an engine set from the selected table based on an identifier of the remote device. A connection to the remote device is created using the engines identified in the selected engine set.

20 Claims, 6 Drawing Sheets

| ENGINE SET | 1st ENGINE | 2nd ENGINE | 3rd ENGINE | 4th ENGINE |
|---|---|---|---|---|
| ENGINE SET 1 | 0 | 1 | 2 | 3 |
| ENGINE SET 2 | 2 | 3 | 4 | 5 |
| ENGINE SET 3 | 4 | 5 | 0 | 1 |

FIG. 2A

200a

| ENGINE SET | 1st ENGINE | 2nd ENGINE | 3rd ENGINE | 4th ENGINE | 5th ENGINE | 6th ENGINE | 7th ENGINE | 8th ENGINE |
|---|---|---|---|---|---|---|---|---|
| ENGINE SET 1 | 0 | 1 | 2 | 3 | 4 | 5 | 6 | 7 |
| ENGINE SET 2 | 4 | 5 | 6 | 7 | 8 | 9 | 10 | 11 |
| ENGINE SET 3 | 6 | 7 | 8 | 9 | 10 | 11 | 0 | 1 |
| ENGINE SET 4 | 8 | 9 | 10 | 11 | 0 | 1 | 2 | 3 |
| ENGINE SET 5 | 10 | 11 | 0 | 1 | 2 | 3 | 4 | 5 |

FIG. 2B

200b

| ENGINE SET | 1st ENGINE | 2nd ENGINE | 3rd ENGINE | 4th ENGINE |
|---|---|---|---|---|
| ENGINE SET 1 | 1 | 2 | 3 | 4 |
| ENGINE SET 2 | 2 | 3 | 4 | 5 |
| ENGINE SET 3 | 3 | 4 | 5 | 6 |
| ENGINE SET 4 | 5 | 6 | 7 | 8 |
| ENGINE SET 5 | 7 | 8 | 9 | 10 |
| ENGINE SET 6 | 9 | 10 | 11 | 0 |
| ENGINE SET 7 | 11 | 0 | 1 | 2 |

SYMMETRIC COMMUNICATION FOR ASYMMETRIC ENVIRONMENTS

CROSS REFERENCE TO RELATED APPLICATION

This is a continuation of U.S. application Ser. No. 17/348,339, filed Jun. 15, 2021, which application is incorporated herein by reference in its entirety.

BACKGROUND

Computing devices often operate using multiple physical and/or virtual processing engines to perform computing tasks. When communicating data between computing devices, connections may be established between different engines. In a symmetric environment, devices that are communicating with one another include the same number of engines, such that each engine on one side of a communication link has a symmetric engine in the other side of the communication link. In an asymmetric environment, devices that are communicating with one another include different numbers of engines. For example, a first device may be in communication with one or more additional devices that have more or fewer engines than the first device. In such an asymmetric environment, connection distributions among engines of the devices may become unbalanced, which may lead to processing delays.

BRIEF DESCRIPTION OF THE DRAWINGS

FIGS. 2A and 2B show examples of engine routing tables including engine sets used for mapping communications between multi-engine nodes in an asymmetric communication environment.

DETAILED DESCRIPTION

Figure 1:
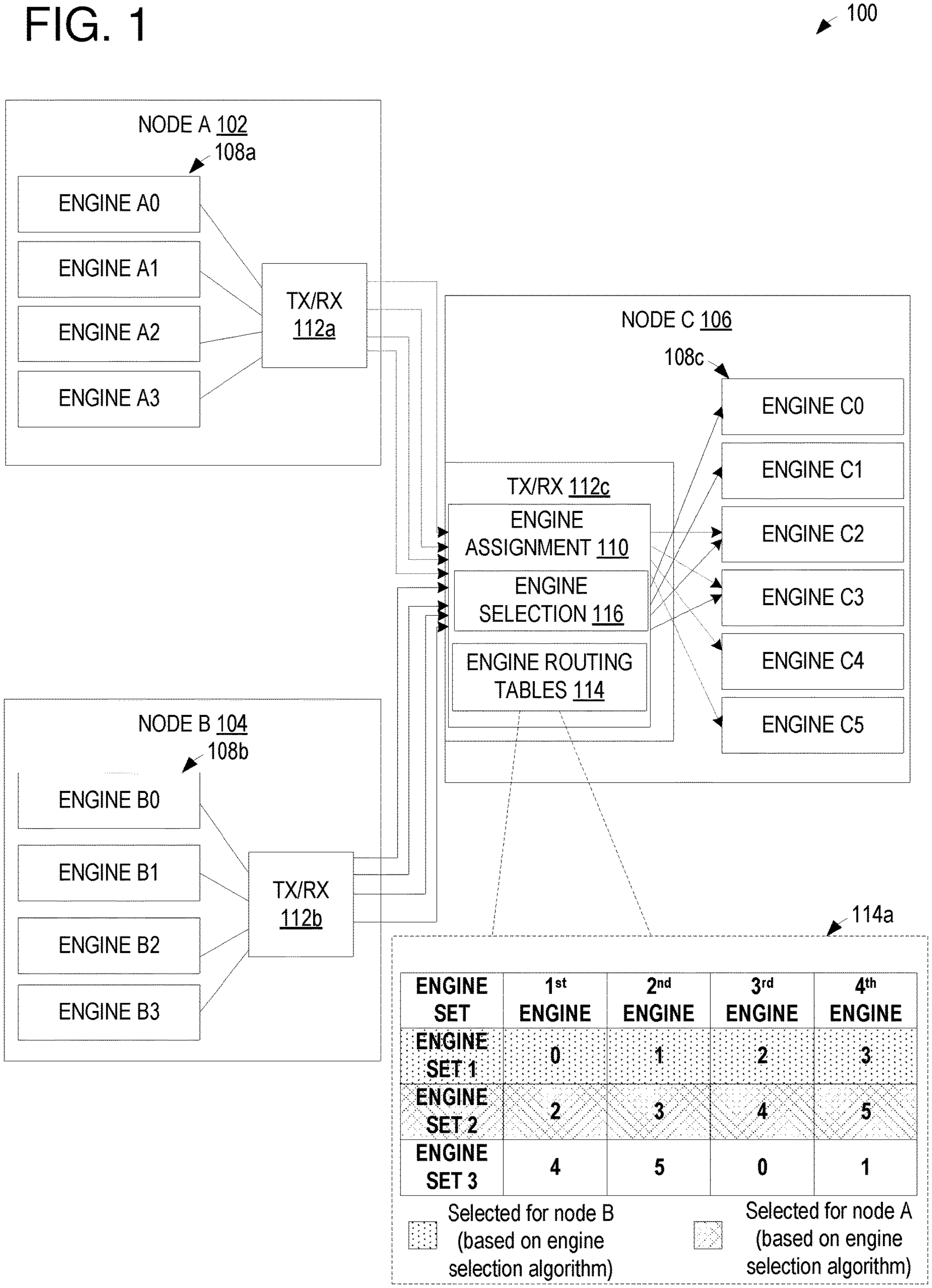
FIG. 1 schematically shows an example of an asymmetric communication environment and the routing of traffic between multiple engines in the environment.

In multi-engine communication applications, each engine (e.g., processing core, hardware engine [e.g., machine learning/artificial intelligence accelerator, dedicated silicon engine, application-specific integrated circuit, etc.], microcontroller, or other engine of a computer node, a firmware core or other engine of a host device, etc.) may manage its communications and/or connections independently. In symmetric environments, in which every engine on a first side of a communication link (e.g., a client side) has a symmetric/corresponding engine on a second side of the communication link (e.g., a server side), every engine in the first side establishes connection with a paired engine in the second side (e.g., physical or virtual engine0 in the client establishes a connection with physical or virtual engine0 in the server, etc.). However, in asymmetric environments, in which devices having different numbers of engines communicate with one another, the selection and distribution of connections between engines may impact communication load balancing and resulting memory usage and processing delays. For example, activating excess engines (in a first device that has more engines than a second device) wastes resources (such as memory) in the excess engines. Further, servicing connections from multiple devices using overlapping engines increases processing load on those engines, which may lead to processing delays.

The disclosure provides mechanisms for efficiently selecting and distributing communication links among engines of processing devices in asymmetric environments. One or both of an initiator device and a receiver device (and/or a centralized negotiator) may execute one or more processing routines to determine communication pairings of engines between the devices. In one example, a first node with the smallest number of engines (n engines) utilizes all of its engines "by default" for communication with a second node, while the second node, with the largest number of engines (m engines), enables only n out of the m engines for this communication. In this way, the second node reduces resource waste associated with enabling all engines when only a subset of the engines are used for communication. Additionally, when a third node (e.g., having k engines) is connected to the second node, the processing routines select engines on the second node side for connecting to the k engines of the third node to reduce overlap between the engines used to connect to the first node, thereby increasing balance between engines and reducing processing delays/bottlenecks. In order to achieve this reduction of overlap in engines, the processing routines access predefined tables of engine mappings (e.g., engine sets) that are optimized for minimal overlap, whereby the first and third nodes are associated with different engine sets. Each of the engine sets may be selected by an algorithm, such as a hashing algorithm that is based on a respective identifier of the first and third nodes. Additional examples and details of the communication link distribution are provided below.

FIG. 1 schematically illustrates an example of an asymmetric communication environment in which two compute processing nodes (node A 102 and node B 104) are in communication with a third node (node C 106). As shown, node A 102 has four engines A0-A3 in engine group 108*a*, node B 104 has four engines B0-B3 in engine group 108*b*, and node C 106 has six engines C0-C5 in engine group 108*c*.

An engine assignment module 110 may be included in node C 106 in some examples, such as within a network interface card (NIC, e.g., transmit/receive circuitry 112*c*) of the node. In other examples, the engine assignment module 112 may be included in an intermediate device between the nodes A/B and node C and/or in another device remote from node C. In some examples, each node (e.g., including nodes A and B) may include a respective engine assignment module (e.g., within transmit/receive circuitry 112*a*/112*b*), and the engine assignment modules may be utilized by initiator devices (e.g., nodes A and B in the illustrated example) to determine which engines to use to send out communication requests, and by receiver devices (e.g., node C in the illustrated example) to determine which engines will receive/service incoming communications.

For example, as nodes A and B have fewer engines than node C, nodes A and B will utilize all of their respective engines for communication. As shown, the transmit/receive circuitry 112*a* and 112*b* receive and propagate data from all of the engines in groups 108*a* and 108*b*, respectively, to node C. However, since node C has more engines than each of nodes A and B, node C utilizes the engine assignment module 110 to determine mapping between the engines in groups 108*a* and 108*b* and the engines in group 108*c*.

In order to determine the engine mapping, the engine assignment module 110 includes a plurality of engine routing tables 114 and an engine selection module 116. The engine routing tables 114 include predetermined tables of engine sets that provide different mappings of remote engines to local engines in the corresponding local node (e.g., node C in the illustrated example). The number and size of the engine routing tables is based on the number of engines in the corresponding node, such that tables are provided for nodes having fewer engines than the node corresponding to the engine assignment module. For example, since node C has six engines, the engine routing tables in engine assignment module 110 may include a table for communicating with nodes having four engines and, optionally, nodes having two engines. As another example, nodes that have twelve engines may configure tables for communicating with nodes having eight engines and nodes having four engines. The number of tables in the engine routing tables may be based on expected engine counts in other nodes that are configured to communicate with the node for which the routing tables are defined. The number of tables may be expanded and/or reduced based on changes to the network and/or communication configurations in some examples.

Each table in the engine routing tables may have rows corresponding to engine sets and columns corresponding to physical/virtual engine IDs for the local nodes. Accordingly, the number of columns for each table is equal to the number of remote engines for which the table is configured (plus an additional column for identifying the engine set number; e.g., the table for four engines has five columns). Each engine set identifies a set of n engines out of the m engines in the local device (e.g., for the four engine table, each engine set has four engines corresponding to four of the six engines of node C in the illustrated example). The engines in the engine set identify which engines of the local device will receive/service communications from the remote device (when included in a receiving device, as illustrated). When included in an initiating device, the engines in the engine set identify which engines of the local device will request/send communications with/to the remote device. An example engine routing table for nodes having four engines is shown at 114*a* and will be described in more detail below. Additional examples of engine routing tables are described in more detail with respect to FIGS. 2A and 2B.

As described above, each table in the engine routing tables 114 includes a plurality of engine sets indicating different subsets of engines of the local node to be used in communication. In order to select an engine set from within the table (e.g., the table being selected based on the number of engines of the remote device) for a given communication request, the engine selection module 116 performs an engine selection process (e.g., implements an engine selection algorithm). In some examples, the engine selection process includes calculating a hash value based on device information such as a remote ID (e.g., an identifier of the requesting/initiator device, such as node A or node B in the illustrated example, or an identifier of the receiver device when the initiator is determining engine sets for sending communications) and selecting an engine set in the table based on the hash value. The use of the remote ID and/or other static remote device information in the hashing provides for consistency in the servicing of communications between the devices, as the same engine set may be selected each time the same two devices are in communication with one another. In other examples, the engine set may be otherwise selected based on the remote ID and/or another parameter (e.g., other device information), or selected based on another algorithm such as a random number generator, a round robin mechanism, etc.

As shown at 114*a*, an example engine routing table for remote devices having four engines is shown, with three example engine sets. In the illustrated example, the identifier for node A is hashed and returns a value corresponding to engine set 2, which includes engines 2, 3, 4, and 5 of node C. Thus, communications from node A are routed to engines C2, C3, C4, and C5 of node C. In some examples, the mapping may be performed in order of the engines in node A, such that engine A0 of node A sends traffic to engine C2 of node C (e.g., the first engine of node A is mapped to the first engine in the selected engine set for node C, etc.), engine A1 sends traffic to engine C3, engine A2 sends traffic to engine C4, and engine A3 sends traffic to engine C5. As further shown in the illustrated example, the identifier for node B is hashed and returns a value corresponding to engine set 1, which includes engines 0, 1, 2, and 3 of node C. Thus, communications from node B are routed to engines C0, C1, C2, and C3 of node C, having a mapping in order as described above with respect to node A (e.g., engine B0 sends traffic to engine C0, etc.).

FIGS. 2A and 2B show example engine routing tables 200*a* and 200*b* that may be used for mapping communications between engines of multi-engine devices in an asymmetric communication environment. Each table includes a plurality of engine sets, each engine set in a given table having a quantity of engine indices associated with that table, where the engine indices correspond to associated physical or virtual engines of the local device. For example, table 200*a* of FIG. 2A is defined for eight engines, and may be stored and/or accessed by devices having more than eight engines when communicating with remote devices having eight engines. In this way, the table defines different subsets of the local device processing engines that may be used to create connections with remote devices having eight engines. Similarly, table 200*b* of FIG. 2B is defined for four engines, and may be stored and/or accessed by devices having more than four engines when communicating with remote devices having four engines. Devices may store/access more than one routing table, accordingly, a device that has more than eight engines may store/access both table 200*a* and table 200*b* in order to apply the disclosed processing engine balancing to incoming/outgoing communications with differently sized devices. As described above (and in more detail below with respect to FIGS. 3 and 4), devices may store/access tables corresponding to fewer processing engines than the quantity of local processing engines, since all engines may be used when communicating with devices having more processing engines than the quantity of local processing engines. For example, for a device having n engines, the device may store and/or access one or more tables defining engine sets that include at most n−1 engine indices. In some examples, the device may store and/or access only one table for each processing engine quantity (e.g., one table for devices with eight engines, one table for devices for four engines, etc.). In other examples, a single table may be defined for multiple n−1 engine quantities (e.g., the tables 200*a* and 200*b* may be included in a single larger table), and different sections of the table may be accessed based on the number of processing engines of a remote device. In some examples, the number of tables may be adjusted as network parameters change. For example, when a local device is only expected to communicate with remote devices having four engines, the local device may only store/access a four-engine table. However, if an eight-engine remote device is added to the network, an eight-engine table may be generated and/or added to the storage of the local device. Likewise, if the local device is upgraded to include additional processing engines, the tables may be adjusted. In some examples, adjustments such as the addition or removal of tables are performed by an engine assignment module (e.g., engine assignment modules 112 of FIG. 1) and/or by a centralized management entity for the network, such as a network monitor that detects changes to the network topology and updates network components/routing controls accordingly. In this way, the disclosed system may be easily adjustable and adaptable to changes in the network and/or device.

As shown, the indices of processing engines in each engine set of a given table are at least partially non-overlapping with all other engine sets in the table. For example, engine set 1 of FIG. 2A includes at least one index (in this example, four indices) that is not included in engine set 2. Engine set 1 similarly differs from each other engine set in the table (e.g., having four indices that are different from each other engine set, noting that the specific indices that are different between the compared engine sets change for each comparison—engine set 1 differs from engine set 2 due to the inclusion of indices 0-3, but differs from engine set 3 due to the inclusion of indices 2-5, etc.). In this way, if multiple connections are made with devices having the same number of processing engines, the selection of different engine sets will result in the distribution of connections among processing engines that minimizes engine usage overlap. For example, as described above in the example of FIG. 1, the selection of engine sets 1 and 2 in the example table 114*a* resulted in only engines C2 and C3 being used by both nodes A and B; otherwise, the engines of nodes A and B were assigned to different engines, thereby increasing overall diversity of traffic distribution and decreasing delays in communication/processing. The number of engine sets for a given table may be selected based on an ability to statistically distribute engine indices among the engine sets to achieve the above described non-overlapping condition (e.g., based at least in part on the number of engines of the local node and/or the number of engines in the engine sets of the table) and/or based on a likelihood of encountering devices having a given quantity of processing engines (e.g., if a network has primarily devices having four engines, the four-engine table may be allotted more engine sets than other tables to ensure availability of diversity). For example, for a device having twelve engines, there may be more non-overlapping four-engine engine sets than eight-engine engine sets. In some examples, the number of engine sets for a given table may be selected based on processing resources of the local node and/or a complexity of a hashing algorithm used to derive an indicator of a selected engine set (as described in more detail below). For example, a node having a relatively high amount of processing resources may include more engine sets in each table than a node having a relatively low amount of processing resources. Accordingly, as shown, the table 200*b* is larger than the table 200*a*. It is to be understood that the tables shown in FIGS. 2A and 2B are provided as illustrative examples, and other tables, quantities of engine sets, and/or engine index distributions may be defined for tables used in the context of this disclosure.

Figure 3:
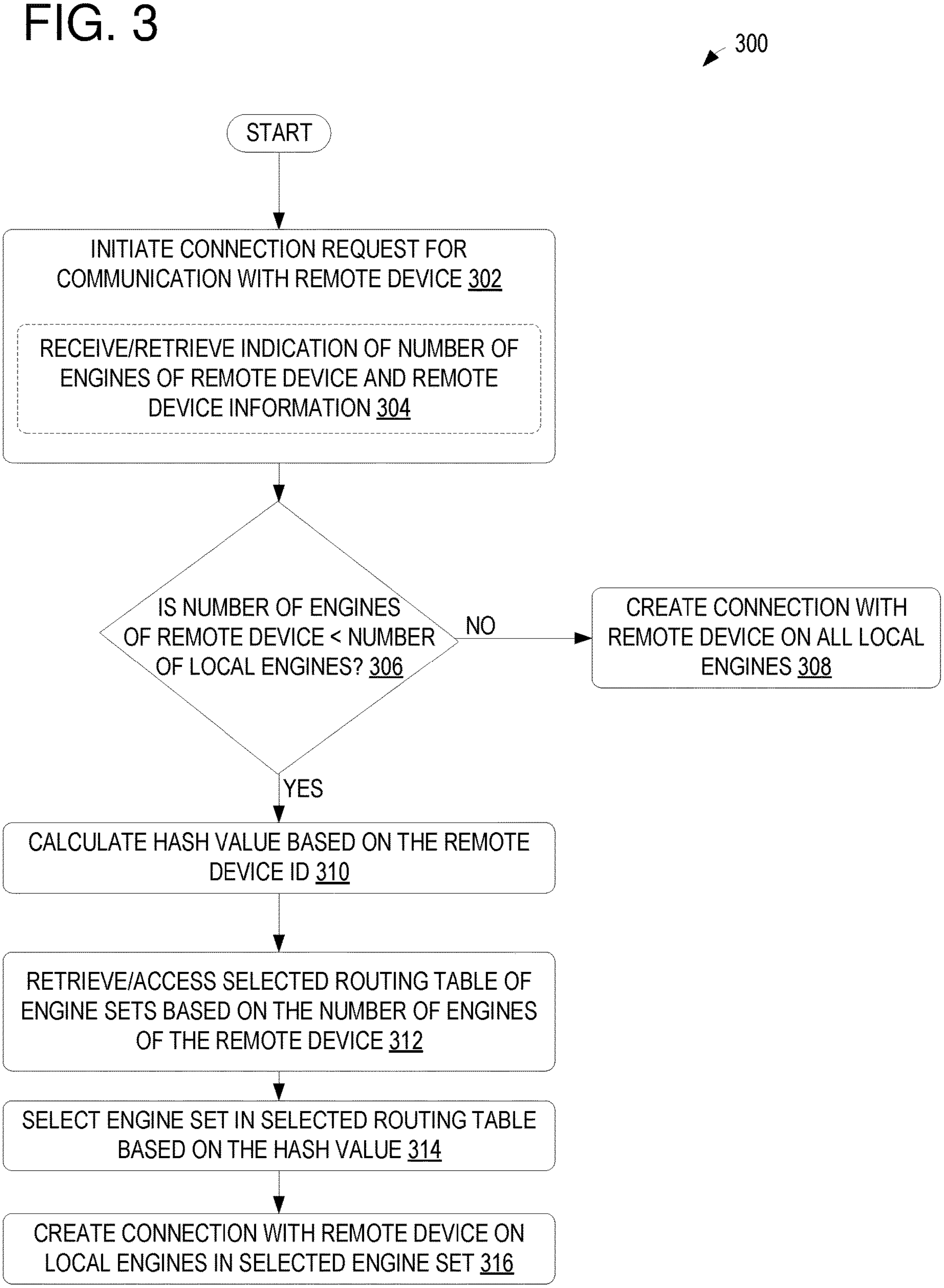
FIG. 3 is a flow chart of an example method for determining the mapping of communication between engines of devices in an asymmetric environment when an initiator device has more engines than a receiver device.

FIG. 3 is a flow chart of an example method 300 for determining the mapping of communication between engines of devices in an asymmetric communication environment when an initiator device has more engines than a receiver device. For example, method 300 may be performed by an initiator device in an asymmetric communication environment in order to determine which engines will be used to send traffic to the engines of the receiver device. In the example illustrated in FIG. 1, nodes A and B are the initiator devices, and method 300 may be performed to determine which of their respective engines are used to create a connection with node C. However, if the communications were reversed, method 300 may be performed by node C (e.g., by the engine assignment module 110) to determine which of its engines are to be used to send traffic to the respective nodes A and B (e.g., completing the method first for one of the nodes, and repeating the method to determine engine mapping for the other node).

At 302, the method includes initiating a connection request for communication with a remote device. As indicated at 304, the method may further include receiving and/or retrieving an indication of a number of engines of the remote device and remote device information, such as a remote device ID, load information, operating information, and/or other information relating to the remote device. For example, the number of engines and/or remote device information may be retrieved from a management entity and/or other storage location (e.g., based on an initial network mapping/connection establishment process) by the local device. The remote device information may include one or more identifiers of the remote device, including a network interface address, media access control (MAC) address, internet protocol (IP) address, etc.

At 306, the method includes determining if the number of engines of the remote device (e.g., the receiving device) is less than the number of local engines. If the number of remote device engines is not less than the number of local engines (e.g., "NO" at 306), then the method includes creating a connection with the remote device on all local engines, as indicated at 308. For example, method 300 may be performed by nodes A and B of FIG. 1, and since node C has more engines, nodes A and B determine that the respective connections are to be created on all of their local engines.

If the number of remote device engines is less than the number of local engines (e.g., "YES" at 306, then the method includes calculating a hash value based on the remote device information, as indicated at 310. In some examples, the hash value may be calculated by hashing multiple device IDs and/or a combination of one or more device IDs and other information of the remote device.

The method further includes at 312 retrieving and/or accessing a selected routing table of engine sets, where the routing table is selected based on the number of engines of the remote device. For example, as shown and described above with respect to FIGS. 2A and 2B, different routing tables may be defined for remote devices having different numbers of engines. At 314, the method includes selecting an engine set in the selected routing table based on the hash value. For example, the hash value may be associated with an engine set identifier. As described above, the device information used to generate the hash information may include static information relating to the remote device, such that the same engine set may be selected for different connection sessions (e.g., to maintain consistency between communication sessions). In other examples, non-static information, such as current load information may be used to select an engine set. In some such examples, to maintain consistency across communication sessions, an indication of an initially-selected engine set may be stored for later use (e.g., to select an engine set during a next communication session between the devices). The hashing algorithm may be modeled on the size of the associated tables, such that, when provided the device information as input, the hashing algorithm applies one or more functions to the device information to generate a value corresponding to one of the engine sets in a targeted table (e.g., targeted based on the number of engines in the remote device).

At 316, the method includes creating a connection with the remote device on the local engines that are included in the selected engine set. For example, if node C were the initiator of the communications in FIG. 1, at the completion of method 300, an engine set of a four engine table is selected for communication with node A, and the engines included in the engine set are used to initiate communications with node A. The method is then repeated for node B (e.g., using the remote ID and/or other device information of node B instead of node A, which would result in the selection of a different engine set).

Figure 4:
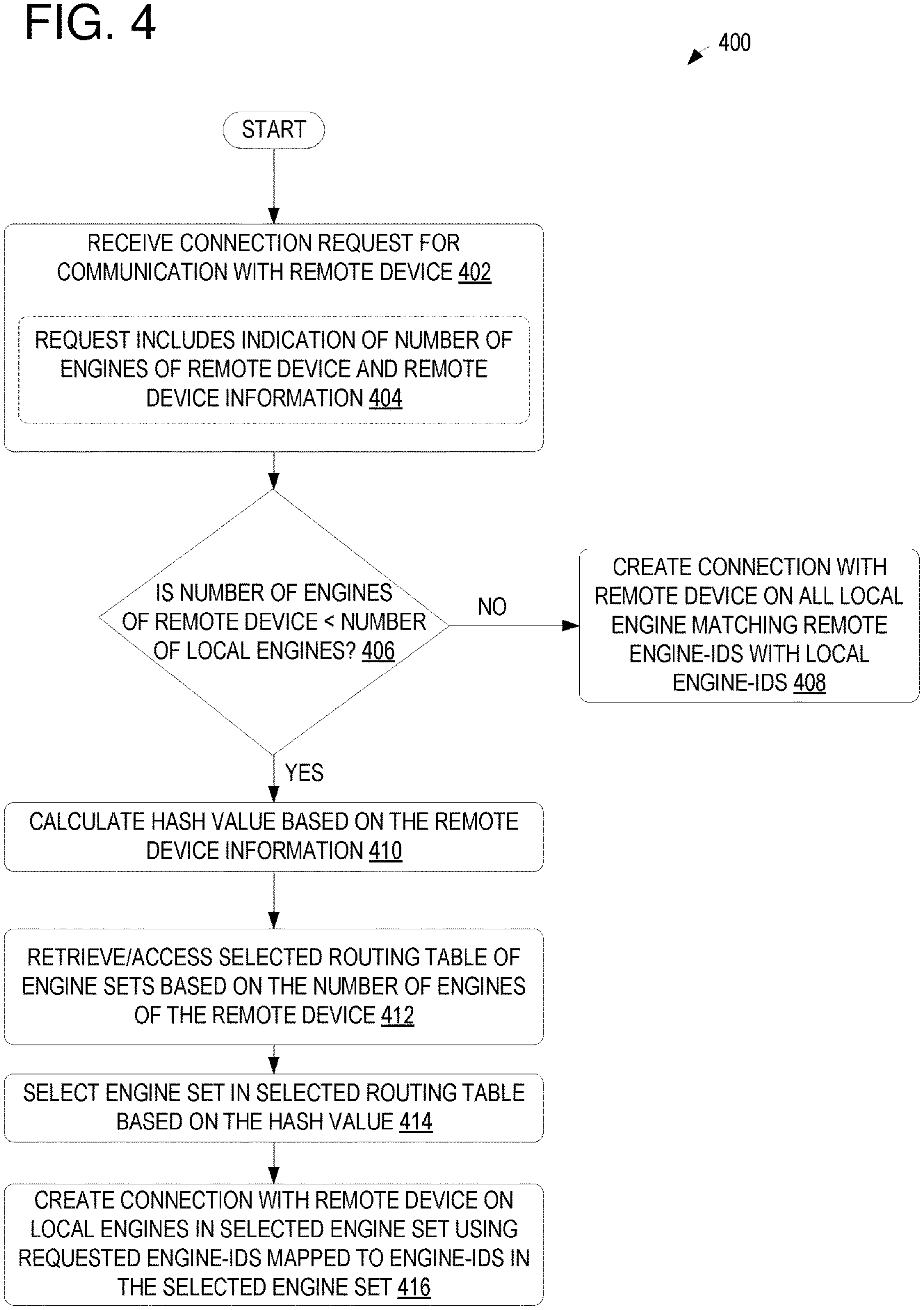
FIG. 4 is a flow chart of an example method for determining the mapping of communication between engines of devices in an asymmetric environment when a receiver device has more engines than an initiator device.

FIG. 4 is a flow chart of an example method 400 for determining the mapping of communication between engines of devices in an asymmetric communication environment when a receiver device has more engines than an initiator device. For example, method 400 may be performed by a receiver device in an asymmetric communication environment in order to determine which engines will be used to service traffic from engines of the receiver device. In the example illustrated in FIG. 1, node C is the receiver device, and method 400 may be performed to determine which of their respective engines are used to communicate with nodes A and B (e.g., completing the method first for one of the nodes, then repeating the method to determine engine mapping for the other node). However, if the communications were reversed, method 400 may be performed by nodes A and B to determine which respective local engines will service the incoming communications from node C.

At 402, the method includes receiving a connection request for communication with a remote device. As indicated at 404, the request may include an indication of a number of engines of the remote device and/or device information (e.g., a remote device ID and/or other information usable to select an engine set, as described above). For example, an effective engines number (EEN) may be included in a network header, such as an 8-bit EEN field of the header, of a packet received from the remote device. In other examples, the device information and/or indication of the number of engines of the remote device may be sent in a separate communication from the connection request.

At 406, the method includes determining if the number of engines of the remote device is less than the number of local engines. If the number of remote device engines is not less than the number of local engines (e.g., "NO" at 406), then the method includes creating a connection with the remote device on all local engines, matching remote engine IDs with local engine IDs, as indicated at 408. For example, method 400 may be performed by nodes A and B of FIG. 1 if communications were reversed, and since node C has more engines, nodes A and B determine that the respective connections are to be created on all of their local engines.

If the number of remote device engines is less than the number of local engines (e.g., "YES" at 406, then the method includes calculating a hash value based on the remote device information, as indicated at 410. The method further includes at 412 retrieving and/or accessing a selected routing table of engine sets, where the routing table is selected based on the number of engines of the remote device. At 414, the method includes selecting an engine set in the selected routing table based on the hash value. At 416, the method includes creating a connection with the remote device on the local engines that are included in the selected engine set using the requested (locally-determined) engine IDs mapped to engine IDs in the selected engine set. For example, a packet from the remote device may include a relative engine ID in the network header of the packet, and this relative engine ID may be mapped to engine IDs in the selected engine set to determine which local engine is to receive and process the packet.

For example, method 400 may be performed by node C of FIG. 1 and, at the completion of method 300, an engine set of a four engine table is selected for communication with node A. The engines included in the engine set are used to create a connection with node A, where the engine IDs from node A are mapped to the engine IDs of node C specified in the selected engine set. The method is then repeated for node B (e.g., using the remote ID and/or other device information of node B instead of node A, which would result in the selection of a different engine set).

In the above examples, additional load balancing may be performed by not allocating all indicated engines at once. For example, at 308 or 408, the local device may instead create a connection with a subset of the local processing engines, and then later create connections with the remaining local engines. A similar process may be used at 316 and 416, whereby connections may be made on a subset of the engines in the selected engine set at first, then the remaining engines of the subset may be used at a later time to create connections. For example, the initial subset of engines may be used for a predetermined time and/or until a threshold amount of traffic is sent/bandwidth is available, and then the other engines may be used. In this way, the described engine selection may be used additionally to define an order of engine usage, as the engines may not be simultaneously engaged. In some examples of the above-described scenario, the subset of engines used for the connection may be agreed upon between the two devices. For example, when communicating a number of engines to one another as described above (e.g., at 304 and 404 of FIGS. 3 and 4, respectively), the number may indicate a subset of the total available engines, rather than the total number of engines of the respective device.

Figure 5:
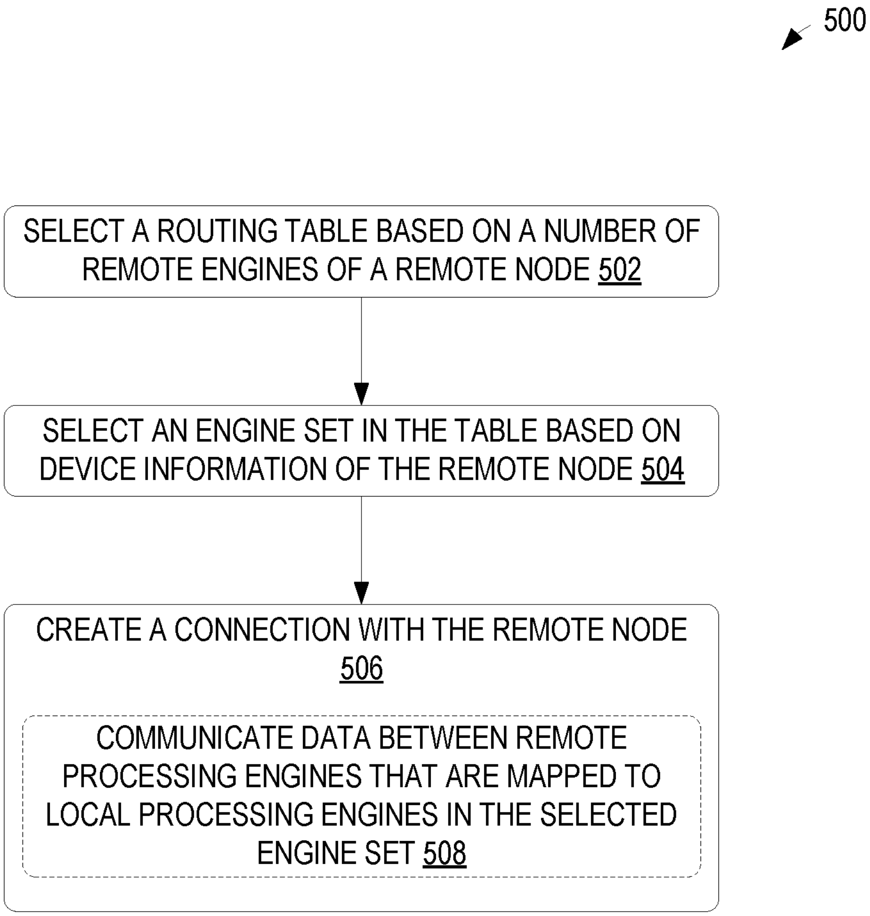
FIG. 5 is a flow chart of an example method for distributing data connections among processing engines using engine routing tables.

FIG. 5 is a flow chart of an example method 500 for distributing data connections among processing engines using engine routing tables. For example, method 500 may be performed by processor executing instructions in memory, such as described above with respect to engine assignment module 110 of FIG. 1. Method 500 may be performed by a local device having more processing engines than a remote device with which a connection is to be created. The number of engines at each device may be determined based on incoming data packets and/or by performing an operation, such as an application programming interface (API) call to retrieve this information (e.g., an effective engines number, which may be provided by a management entity or other storage device and/or included in a header of a packet). At 502, the method includes selecting a routing table based on a number of remote engines of a remote node. Examples of routing tables are shown at 114 of FIGS. 1 and 200*a* and 200*b* of FIGS. 2A and 2B, respectively. As described above, the engine routing tables may include a plurality of engine sets, which include indices representing a subset of local processing engines for a local node.

At 504, the method includes selecting an engine set in the table based on device information (e.g., an identifier and/or other information) of the remote node. As described above, the information may be hashed or otherwise applied to an algorithm to determine a value that is usable to select one of the engine sets of the selected table. At 506, the method includes creating a connection with the remote node. As indicated at 508, data is communicated between local processing engines of a local node and the remote processing engines of the remote node by mapping each of the remote processing engines to a respective local processing engine included in the selected engine set. For example, a relative engine ID of a remote processing node (e.g., retrieved via an API call or other mechanism from storage and/or a packet header) associated with incoming data may be mapped to a corresponding index in the selected engine set to determine which local processing engine is to connect to the remote processing node. The above may be performed for each remote/local processing node for which connection is being established.

Figure 6:
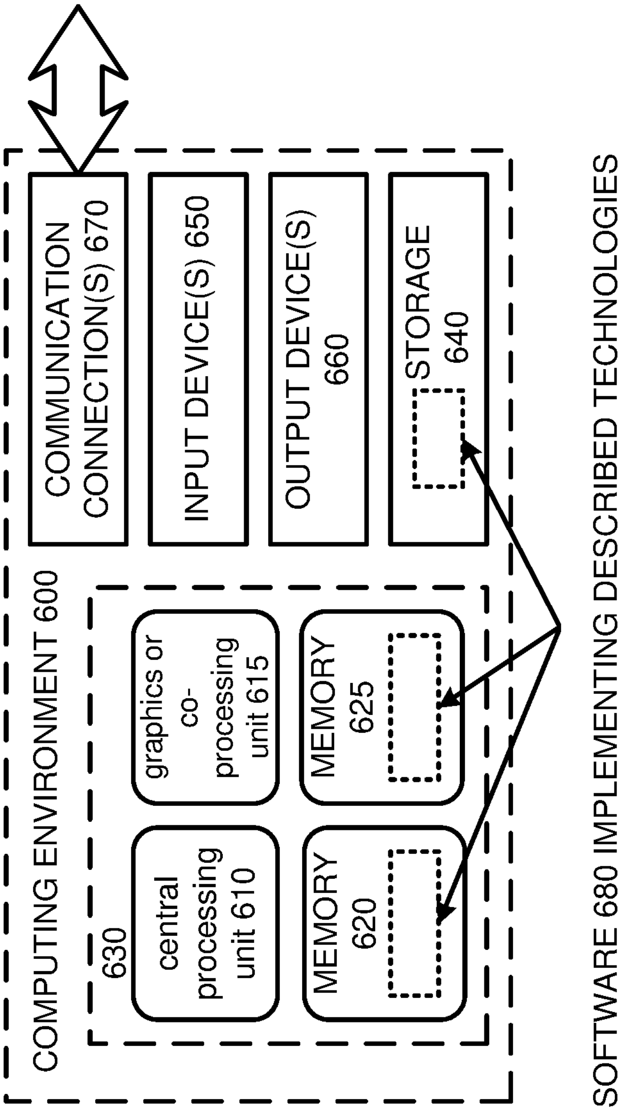
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.). The computing environment 600 may include and/or be included in nodes A, B, and/or C of FIG. 1 in some examples.

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. For example, the engines of nodes A, B, and C of FIG. 1 may correspond to processing engines of the central processing unit 610 and/or the graphics or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. For example, the transmit and/or receive circuitry 112*a-c* of FIG. 1 may be examples of communication connections 670. The engine assignment module 110 of FIG. 1 may utilize processing and/or storage resources of the communication connections 670 and/or of the basic configuration 630. For example, the engine routing tables may be stored in memory 620, 625, storage 640, and/or memory local to a network interface chip included in communication connections 670. The engine selection module may utilize processing resources such as central processing unit 610, graphics or co-processing unit 615, and/or processor(s) local to a network interface chip included in communication connections 670.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:

a first, remote node comprising a plurality of remote processing engines; and a second, local node comprising a plurality of local processing engines, the local node further comprising a processor and memory storing instructions executable by the processor to create a connection between the remote processing engines and the local processing engines, the instructions comprising:

instructions to determine a quantity of the remote processing engines;

instructions to determine a quantity of local processing engines to use to communicate with the remote node;

instructions to create a connection with the remote node, wherein data is communicated between the local and remote processing engines using the determined quantity of the local processing engines; and instructions to map incoming data from the remote processing engines to respective local processing engines by:

selecting a routing table comprising a plurality of engine sets based on the number of processing engines of the remote node, the plurality of engine sets including at least partially non-overlapping subsets of the local processing engines, determining an identifier of the remote node, selecting an engine set of the selected routing table based on the identifier of the remote node, and communicating data between each of the remote processing engines and a respective local processing engine included in the selected engine set.

2. The system of claim 1, further comprising generating a hash based on the identifier of the remote node, wherein the engine set is selected based on the hash.

3. The system of claim 2, wherein the hash is generated by hashing a plurality of identifiers associated with the remote node.

4. The system of claim 1, wherein determining the quantity of the remote processing engines comprises retrieving an effective engines number from a header of a packet received from the remote node, and wherein communicating data between each of the remote processing engines and a respective local processing engine included in the selected engine set comprises selecting the respective local processing engine from the selected engine set using a relative engine ID for a respective remote processing engine included in the header of the packet.

5. The system of claim 1, wherein the processor and memory are included in a network interface card (NIC) of the local node, wherein the selected routing table is one of a plurality of routing tables stored in the memory, wherein each of the plurality of routing tables is defined for a different quantity of processing engines, and wherein each of the plurality of routing tables is defined for a respective quantity of processing engines that is less than the quantity of the local processing engines.

6. A method comprising:

selecting a routing table comprising a plurality of engine sets based on a quantity of remote processing engines of a remote node, the plurality of engine sets including at least partially non-overlapping subsets of local processing engines of a local node, wherein the routing table is selected based on having a quantity of the local processing engines in each of the plurality of engine sets that corresponds to the quantity of remote processing engines of the remote node;

selecting an engine set of the plurality of engine sets in the selected routing table based on device information of the remote node; and creating a connection with the remote node, wherein data is communicated between the local processing engines of the local node and the remote processing engines of the remote node by mapping each of the remote processing engines to a respective local processing engine included in the selected engine set.

7. The method of claim 6, further comprising hashing the device information and determining the selected engine set of the selected routing table based on the hashed device information.

8. The method of claim 7, wherein the hashed information is generated by hashing one or more of an internet protocol (IP) address or a media access control (MAC) address of the remote node.

9. The method of claim 6, wherein the remote node is an initiator of a communication request, and wherein the method includes receiving the communication request, the communication request including an indication of the number of remote processing engines and the device information of the remote node.

10. The method of claim 9, wherein received data from the remote node includes an indication of a relative engine ID that is mapped to an associated engine ID in the selected engine set, and wherein creating the connection comprises directing the received data to the local processing engine that corresponds to the associated engine ID in the selected engine set.

11. The method of claim 6, wherein the remote node is a receiver of a communication request, and wherein the method further includes transmitting an indication of a number of local processing engines and device information of the local node, wherein the indication of the number of local processing engines is a subset of a total available number of local processing engines.

12. The method of claim 11, wherein the method includes transmitting data using a selected local processing engine from the selected engine set.

13. The method of claim 6, wherein the remote node is a first remote node and the selected engine set is a first engine set, the method further comprising creating a connection with a second remote node, wherein data is communicated between the local processing engines and remote processing engines of the second remote node by: selecting a second engine set of a second selected routing table, the second selected routing table being selected based on the number of remote processing engines of the second remote node, and the second engine set being selected based on an identifier of the second remote node, and mapping each of the remote processing engines of the second remote node to a respective local processing engine included in the second engine set.

14. The method of claim 13, wherein at least some of the local processing engines included in the second engine set are different than the local processing engines included in the first engine set.

15. A computer-readable storage medium having stored thereon instructions that, when executed by one or more processors, cause the one or more processors to perform the method of claim 6.

16. A computer-implemented method, comprising:

in a receiving device:

determining a number of initiator processing engines of an initiator device;

selecting a first routing table based on the number of initiator processing engines, the first routing table including a first plurality of engine sets each identifying a number of engine IDs corresponding to receiving processing engines of the receiving device;

selecting a first engine set from the first routing table based on initiator device information for the initiator device; and communicating with the initiator device using the receiving processing engines identified in the first engine set; and in the initiator device:

determining a number of receiving processing engines of the receiving device;

selecting a second routing table based on the number of receiving processing engines, the second routing table including a second plurality of engine sets each identifying a number of engine IDs corresponding to the initiator processing engines;

selecting a second engine set from the second routing table based on receiving device information for the receiving device; and communicating with the receiving device using the initiator processing engines identified in the second engine set.

17. The computer-implemented method of claim 16, further comprising wherein the initiator device is a first initiator device, the method further comprising, hashing initiator device information for the first initiator device to generate a first hash and hashing the receiving device information for the receiving device to generate a second hash, wherein the first engine set is selected based on the first hash and the second engine set is selected based on the second hash, and wherein the method further comprises in the receiving device:

determining a number of second initiator processing engines of a second initiator device, selecting a third routing table based on the number of second initiator processing engines, the third routing table including a third plurality of engine sets each identifying a number of engine IDs corresponding to receiving processing engines of the receiving device;

hashing second initiator device information for the second initiator device to generate a third hash;

selecting a third engine set from the third routing table based on the third hash; and communicating with the second initiator device using the receiving processing engines identified in the third engine set.

18. The computer-implemented method of claim 17, wherein the receiving processing engines identified in the first engine set and the third engine set are at least partially non-overlapping.

19. The computer-implemented method of claim 17, wherein the first engine set includes a first set of indices and the third engine set includes a second set of indices, and wherein the computer-implemented method further comprises mapping each index of the first engine set to a respective engine ID of the remote processing engines, and mapping each index of the third engine set to a respective engine ID of the remote processing engines.

20. The computer-implemented method of claim 16, wherein the first routing table is predetermined and stored in a storage device that is included in or connected to the receiving device and wherein the second routing table is predetermined and stored in a storage device that is included in or connected to the initiator device.

* * * * *